(12) United States Patent
Stewart

(10) Patent No.: US 7,146,822 B2
(45) Date of Patent: Dec. 12, 2006

(54) CENTRIFUGAL LIQUID PUMP WITH PERIMETER MAGNETIC DRIVE

(75) Inventor: Glenn E. Stewart, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 10/334,996

(22) Filed: Dec. 30, 2002

(65) Prior Publication Data

US 2004/0123614 A1 Jul. 1, 2004

(51) Int. Cl.
*F25D 23/12* (2006.01)
(52) U.S. Cl. .................................. 62/259.2; 62/3.3
(58) Field of Classification Search ............... 62/259.2, 62/3.3, 505; 417/368; 415/112; 361/688
See application file for complete search history.

(56) References Cited

U.S. PATENT DOCUMENTS

| | | | | |
|---|---|---|---|---|
| 4,065,232 A | * | 12/1977 | Stratienko | .................. 417/368 |
| 4,272,084 A | * | 6/1981 | Martinson et al. | .......... 277/365 |
| 5,184,945 A | * | 2/1993 | Chi-Wei | ...................... 417/420 |
| 5,336,064 A | * | 8/1994 | Lamers | ..................... 417/423.3 |
| 6,308,524 B1 | * | 10/2001 | Mochizuki et al. | ........ 62/259.2 |

FOREIGN PATENT DOCUMENTS

DE 3536140 A1 * 4/1987

* cited by examiner

*Primary Examiner*—Melvin Jones
(74) *Attorney, Agent, or Firm*—Marger Johnson & McCollom PC

(57) ABSTRACT

Embodiments of the invention provide a compact, seal-less, centrifugal liquid pump with a perimeter magnetic drive that is substantially smaller than a conventional centrifugal liquid pump having magnets attached directly to the impeller shaft. Because rotational force is applied at the perimeter of the impeller, rather than at the shaft, embodiments of the invention have lower torque requirements and rotational speed, increasing the life of the pump bearings. Additionally, embodiments of the invention may suspend the pump bearings by using a redirected flow of liquid coolant, further increasing the bearing life.

34 Claims, 7 Drawing Sheets

CENTRIFUGAL LIQUID PUMP WITH PERIMETER MAGNETIC DRIVE

BACKGROUND OF THE INVENTION

1. Technical Field of the Invention

This disclosure relates in general to liquid cooling (LC) systems, and in particular to cooling systems having centrifugal pump devices with magnetic drives.

2. Description of the Related Art

A cross-sectional diagram of a conventional seal-less centrifugal pump 10 with a magnetic drive is illustrated in FIG. 1. When the pump 10 is operating, liquid is drawn into the pump through an inlet 102 and is expelled from the pump through an outlet 104. An impeller assembly 106 forces the liquid to the outlet 104. The impeller assembly 106 has an impeller shaft 110 connected to impeller magnets 120. The impeller magnets 120 are contained within an impeller magnet housing 124. An inner motor housing 126 separates the impeller magnets 120, impeller shaft 110, and impeller assembly 106 from other motor components within an outer motor housing 122. These components include motor poles 112, motor windings 114, motor electronics 116, and a circuit board 118. The entire outer motor housing 122 is attached to mounting feet 124, which can in turn be connected to a suitable mounting surface (not shown).

The pump 10 is described as seal-less because the impeller shaft 110 is located completely within the region of the pump 10 where liquid is present. Thus, there is no need for shaft seals because the impeller shaft 110 does not transition from a "dry" region to a "wet" one. A pump that does not require shaft seals is more reliable and less likely to develop leaks. When used in an electronic assembly, it is imperative that the pump not leak coolant. The motor electronics 116 selectively apply current to the motor windings 114 located about the impeller shaft 110, generating a rotating magnetic field about the impeller shaft 110 and impeller magnets 120. The magnetic field acts upon the impeller magnets 120, which are connected to the impeller shaft 110, causing the impeller shaft 110 to rotate and spin the attached impeller assembly 106.

The operation of this type of pump is well-known in the art. A significant disadvantage to this type of pump is that the magnets are connected directly to the impeller shaft. Therefore, the necessary torque required to spin the impellers is relatively large since the distance between the attached magnet and the impeller shaft creates a lever arm of minimal length. This torque disadvantage requires the pump size in the direction parallel to the axis of rotation of the impeller to be quite large in order to generate the required amount of torque. In other words, the impeller shaft must be relatively long and the impeller magnets and poles must be quite large.

FIG. 2 is a diagram of some of the main components of a conventional spindle motor, for instance, the type used in a floppy disk drive. Attached to a circuit board 200 there is a controller 210 and a number of stator coils 220 having a radial arrangement around a spindle receptacle 230. Other circuit components are attached to the circuit board 200 as well, but for ease of description, only the controller 210 is shown. A rotor 240 includes a ring magnet 250 attached to the perimeter of the rotor 240, and a spindle 260 affixed to the center of the rotor 240. The rotor 240 is shown detached from the circuit board 200 for clarity. When the spindle motor is assembled, the rotor 240 couples to the spindle receptacle 230 via the spindle 260, and the ring magnet 250 lies just outside the perimeter of the stator coils 220. In other words, the surfaces of rotor 240 and circuit board 200 that are shown in FIG. 2 face each other when the spindle motor is fully assembled. The rotor 240 is not flat, but rather is shaped similar to a dome or a saucer so that the rotor 240 does not contact the stator coils 220. The dome-shaped appearance of rotor 240 is not visible in FIG. 2.

The operation of a floppy disk drive motor is well-known in the art. Briefly, the controller 210 causes the stator coils 220 to produce a rotating magnetic field. This magnetic field acts on the ring magnet 250 and causes the rotor 240 and the attached spindle 260 to rotate. The spindle 260, in turn, rides in the spindle receptacle 230, which is an axial and thrust bearing. A floppy disk (not shown) is detachably engaged to the spindle receptacle 230. In this manner, when the spindle motor rotates and the floppy disc is so engaged, the floppy disk drive causes the floppy disk to rotate. All the components shown in FIG. 2, along with others not shown, form a floppy disk drive that is designed to fit within a disk drive bay.

Where cooling of computer systems is concerned, in general only the larger network computers utilize LC systems. Smaller personal or desktop computers typically use a forced-air system to cool the electronic components, but LC is available for these computers as well. These commercially-available LC systems mount a large form factor pump in an add-on chassis compartment to the bottom of the computer chassis. The add-on chassis compartment is similar in dimension to the computer chassis and is approximately 4 inches tall. Alternatively, conventional LC systems for desk-top computers house the pump and other components in an external box that is not affixed to the computer chassis. The liquid coolant circulates through tubing between the computer chassis and the external box where the LC system components are housed.

Embodiments of the invention address these and other limitations of the prior art.

BRIEF DESCRIPTION OF THE DRAWINGS

A detailed description of the invention requires reference to the following drawings, where like numbers indicate like elements throughout.

DETAILED DESCRIPTION OF THE INVENTION

Particular embodiments of the invention will now be explained with reference to the drawings. Although the remainder of the discussion will focus on the problems involved with LC systems for desktop computers, it will be apparent to those of ordinary skill in the art that there are many variations and modifications of the invention that nonetheless are still within the scope of the invention.

Embodiments of the invention may be used in any situation where a pump with a reduced size is desired. As will be shown below, embodiments of the invention can pump as efficiently as larger, conventional centrifugal liquid pumps.

Figure 1:
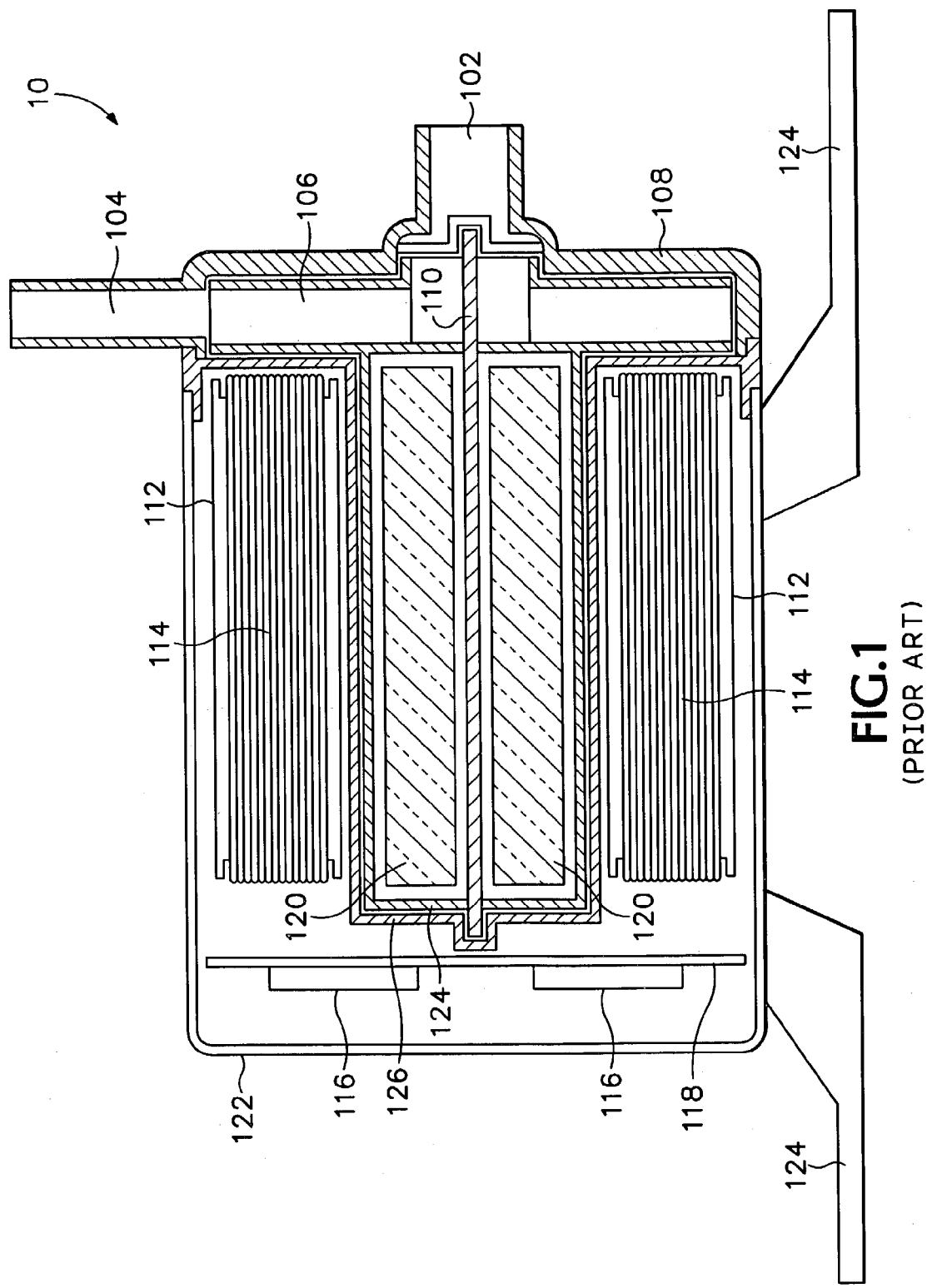
FIG. 1 is a cross-sectional diagram of a conventional seal-less centrifugal liquid pump with a magnetic drive.
Figure 2:
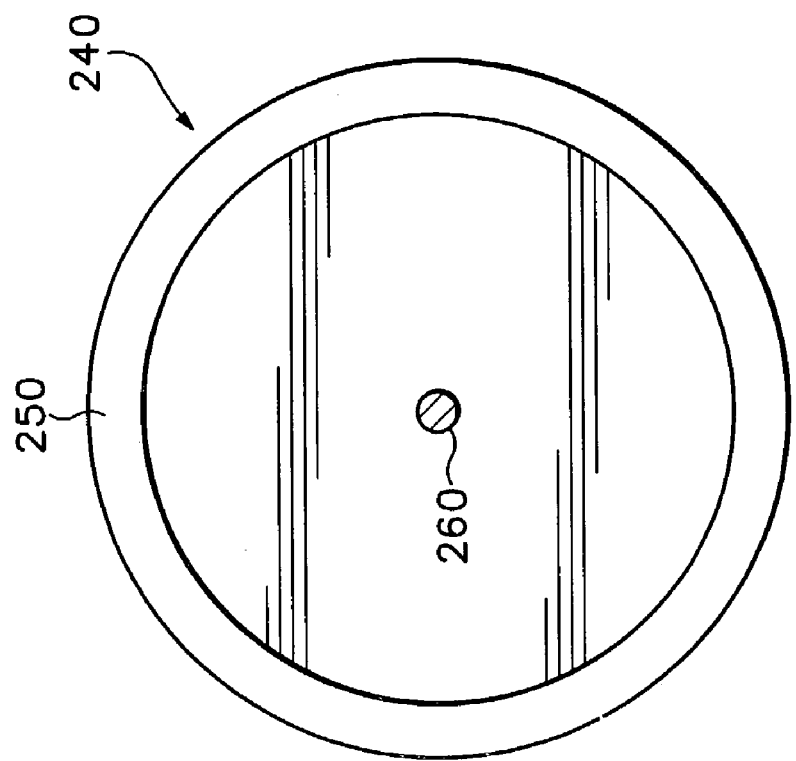
FIG. 2 is a diagram of some of the main components of a conventional spindle motor of the type used in floppy disk drives.
Figure 2:
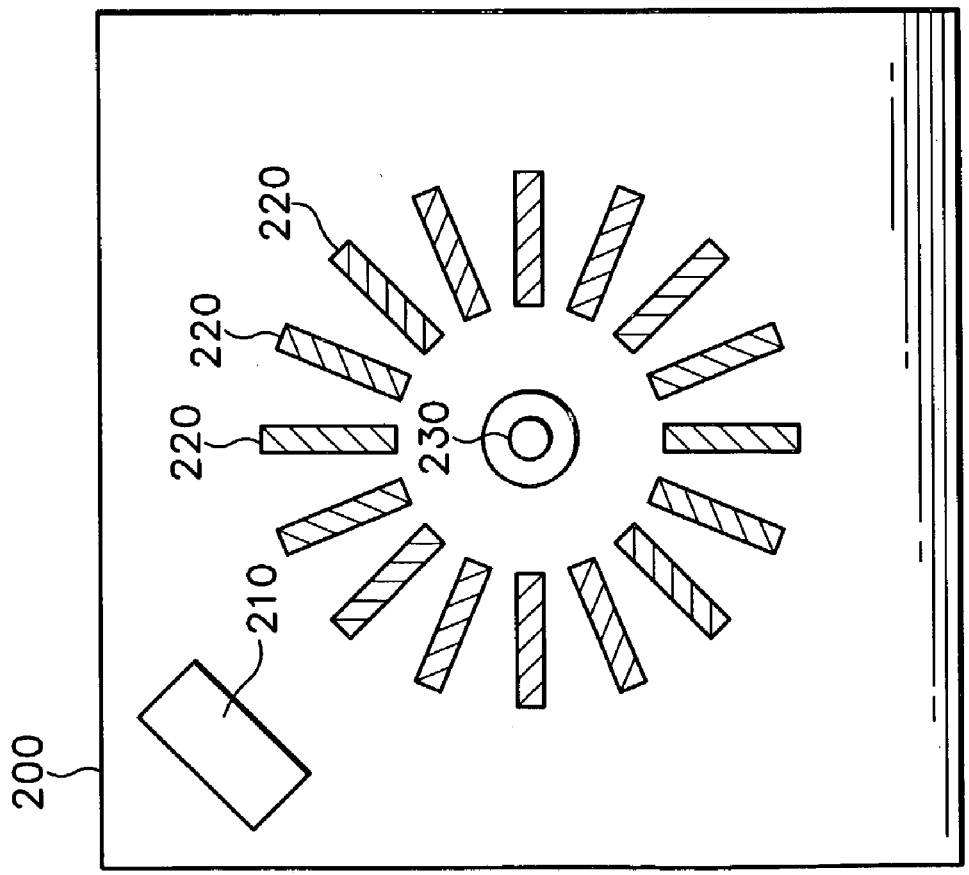
Figure 3:
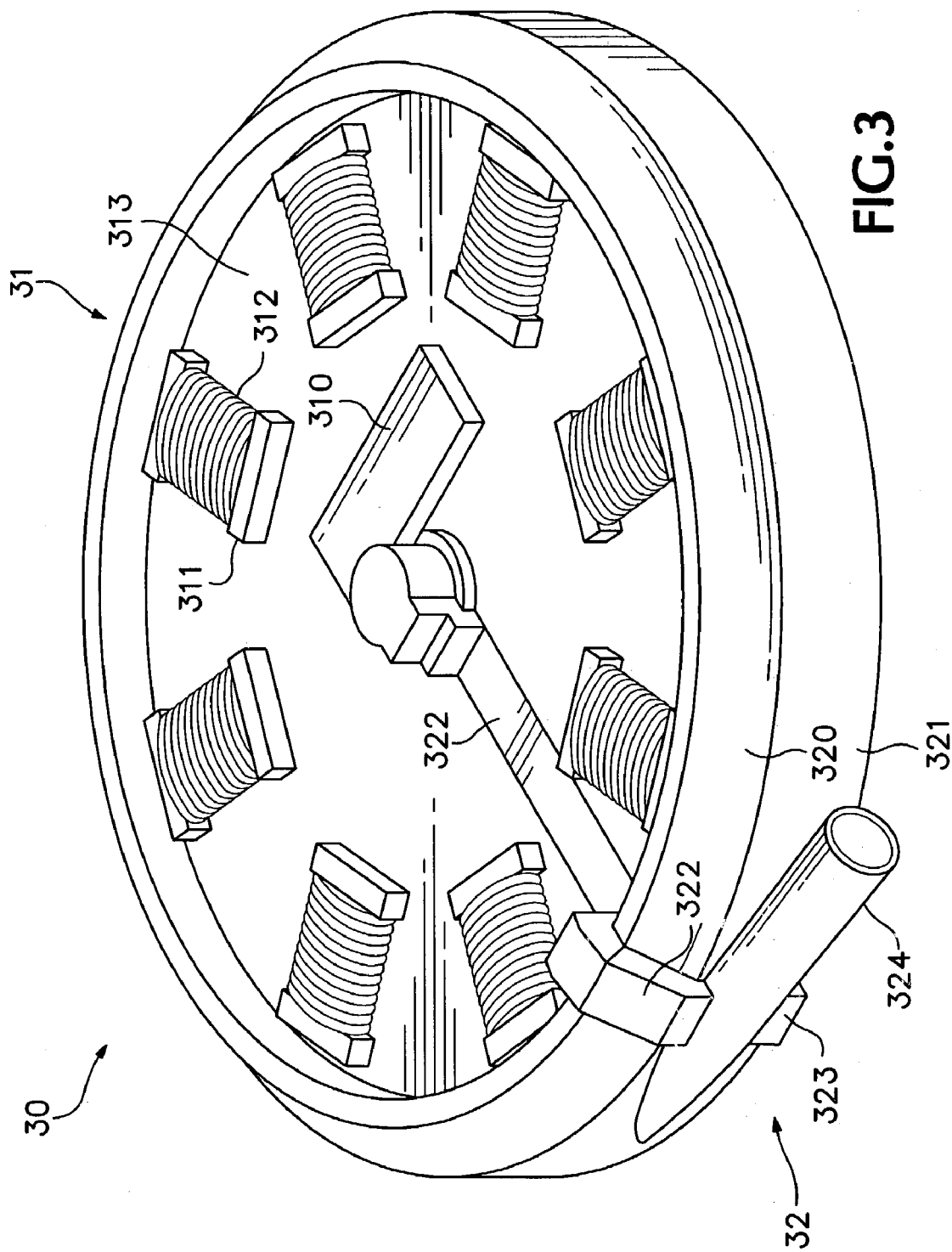
FIG. 3 is an isometric view of a centrifugal liquid pump according to an embodiment of the invention.

FIG. 3 is an isometric view of the top of a centrifugal liquid pump assembly 30 according to an embodiment of the invention. The pump assembly 30 includes a motor electronics assembly 31 and a pump housing assembly 32. The motor electronics assembly 31 includes a motor controller 310, a set of motor pole cores 311, and wire windings 312 that are wrapped around the motor pole cores 311. These components are affixed to the top of a circuit board 313. The circuit board 313 rests on top of the pump housing assembly 32. During operation, the motor controller 310 causes the wire windings 312 around the motor pole cores 311 to generate a rotating magnetic field.

An interior of the pump housing assembly 32 holds an impeller assembly (not shown), including upper and lower bearings (not shown). The components of the pump housing assembly 32 that are illustrated in FIG. 3 include an upper pump housing 320 and a lower pump housing 321. Preferably, the upper pump housing 320 and lower pump housing 321 are plastic parts that are manufactured separately, and then permanently attached to each other after components that are located within the pump assembly 30 are placed between the two halves of the pump assembly. An outlet 324 is an integral part of the lower pump housing 321, and is preferably made of molded plastic at the same time that the lower pump housing is made. The upper surface of the upper pump housing 320 is attached to the circuit board 313. The pump housing assembly 32 also includes an upper hydrodynamic bearing supply line (HBSL) 322 and a lower HBSL 323.

The upper HBSL 322 and lower HBSL 323 can be formed as molded plastic features of the upper pump housing 320 and lower pump housing 321, respectively. The upper HBSL 322 appears in FIG. 3 to sit directly on top of the circuit board 313, however, they are preferably separate. Although not shown in FIG. 3, the upper HBSL is typically connected directly to the upper pump housing 320. There is a channel (not shown) cut into the circuit board 313 to accommodate the upper HBSL 322. The upper HBSL 322 and the lower HBSL 323 enclose spaces that are separate and distinct from the space enclosed by the upper pump housing 320 and the lower pump housing 321. There are openings (not shown) in the side of the outlet 324 that connect the space enclosed by the upper and lower pump housings 320, 321 to the space enclosed by the upper HBSL 322 and lower HBSL 323, respectively.

During operation of pump assembly 30, some of the coolant that is forced from the pump through outlet 324 is routed through the openings in the outlet and into the upper HBSL 322 and lower HBSL 323. The upper HBSL 322 and lower HBSL 323 act as separate channels that direct some of the coolant back towards the center of the pump housing assembly 32. At the radially inner end of the upper HBSL 322 and the lower HBSL 323, the coolant reenters the pump housing assembly 32 at the points where the upper and lower bearings (not shown) of the impeller assembly are located. The liquid flow is sufficient to suspend the upper and lower bearings (not shown) away from the sides of the upper pump housing 320 and lower pump housing 321. This significantly increases bearing life and in turn, the useful life of the pump assembly 30. Alternately, the upper HBSL 322 and lower HBSL 323 could be omitted, although bearing life would probably be shortened.

Figure 4:
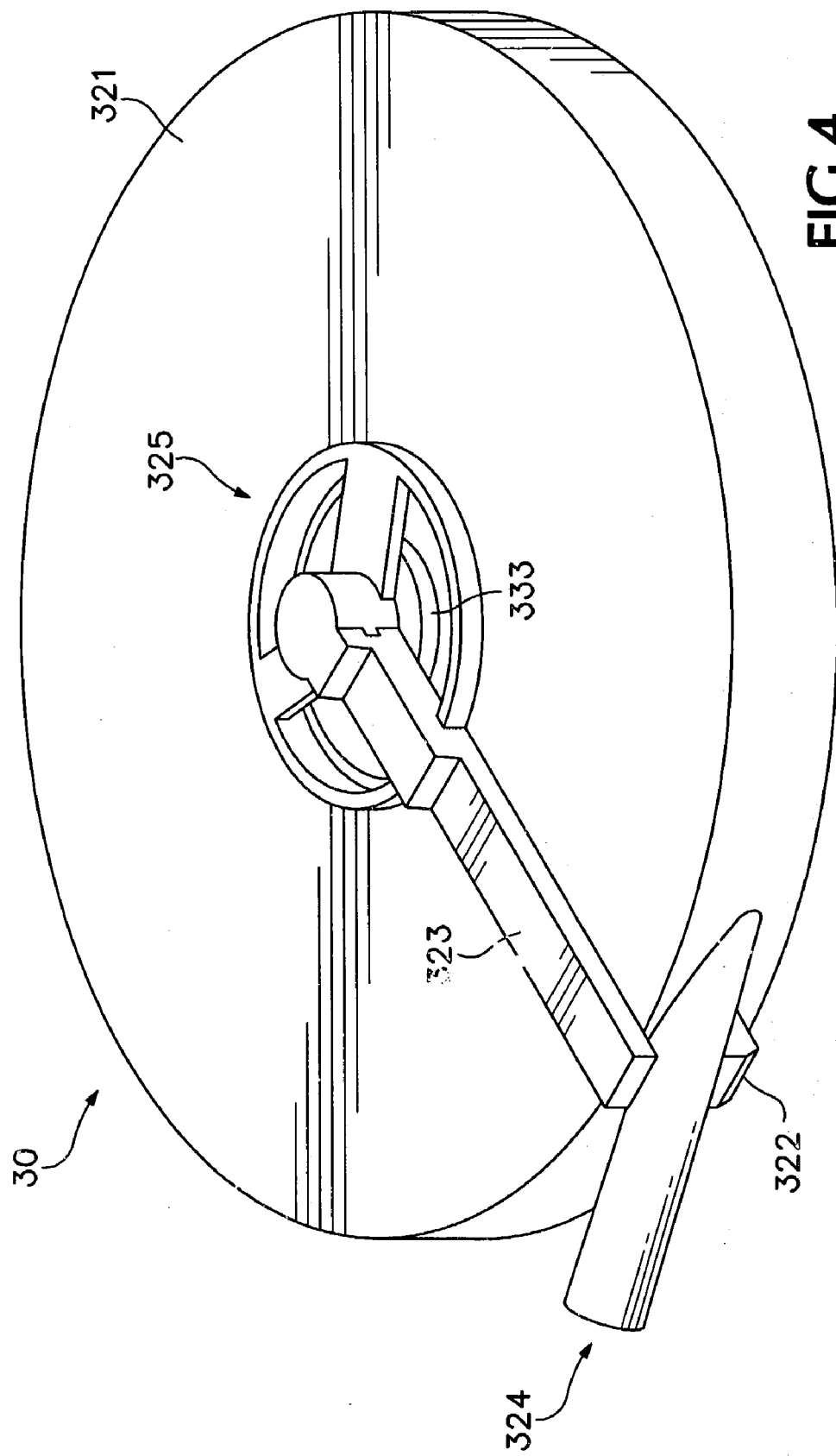
FIG. 4 is an isometric view of the bottom of the centrifugal liquid pump shown in FIG. 3.

FIG. 4 is an isometric view of the bottom of the centrifugal liquid pump assembly 30 of FIG. 3. FIG. 4 shows a lower pump housing 321, the outlet 324, the lower HBSL 323, and a portion of the upper HBSL 322. The function of these components was explained previously with reference to FIG. 3. FIG. 4 also shows an inlet 325 and a lower bearing 333, which is part of the impeller assembly (not shown) that is housed inside the pump housing assembly 32. As explained above, the lower HBSL 323 directs coolant from the outlet 324 back to the center of the pump housing assembly 32, preventing the bearing 333 from making contact with the lower pump housing 321. During operation of pump assembly 30, tubing is connected to the outlet 324 and the inlet 325. The tubing directs the liquid toward the heat-exchange areas of the LC system. This aspect of the invention will be explained later in further detail.

Figure 5:
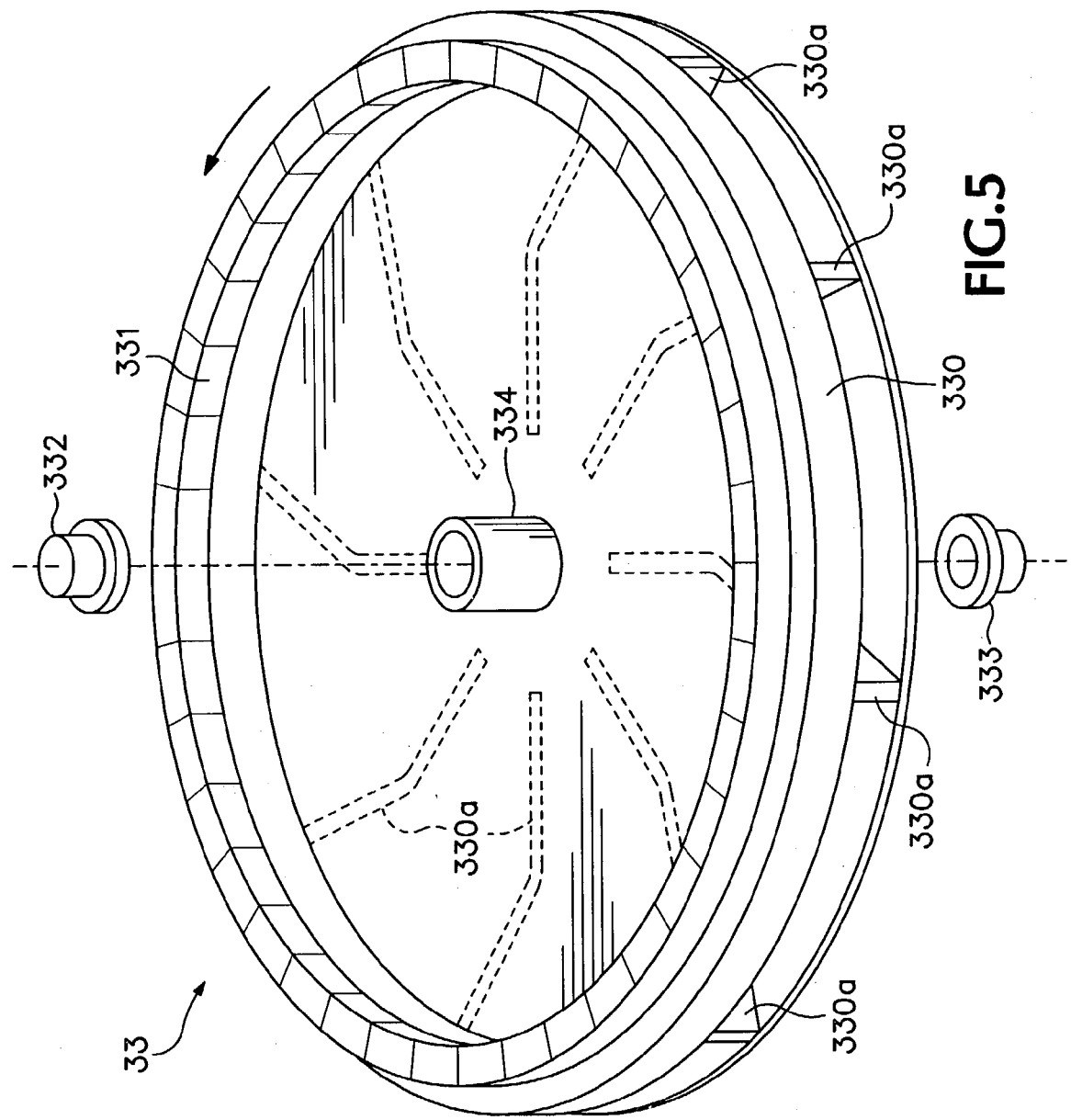
FIG. 5 is an isometric view of the top of the impeller assembly of the centrifugal liquid pump shown in FIG. 3.

FIG. 5 is an isometric view of the top of the impeller assembly 33 of the centrifugal liquid pump assembly 30 shown in FIG. 3. The impeller assembly 33 includes an impeller 330, a ring magnet 331 affixed to the perimeter of the impeller 330, an upper bearing 332, a lower bearing 333, and an impeller shaft 334. These components that make up the impeller assembly 33 are the only components that are in motion during the operation of pump assembly 30.

The impeller 330 illustrated in FIG. 5 has eight fins 330a that are arranged in a pin-wheel type pattern, although any number of fins could be used, arranged in any operative pattern. For example, there may be 10 fins 330a arranged along a radius of the impeller 330, with each fin 330a separated from the other by an angle of approximately 36 degrees. The function of the fins 330a is to push the liquid coolant toward the outside of the pump housing assembly 32 as the impeller 330 spins. As illustrated in FIG. 5, the impeller fins 330a operate in a counterclockwise direction, although the fins could be shaped to operate in the clockwise direction just as well. The dashed lines of the fins 330a within the interior of impeller 330 are present only to show the pattern of the fins 330a within the interior of the impeller 330. The fins 330a are directly viewable only from the side of the impeller 330, as the top surface of the impeller covers the fins in a completed pump assembly 30.

Figure 6:
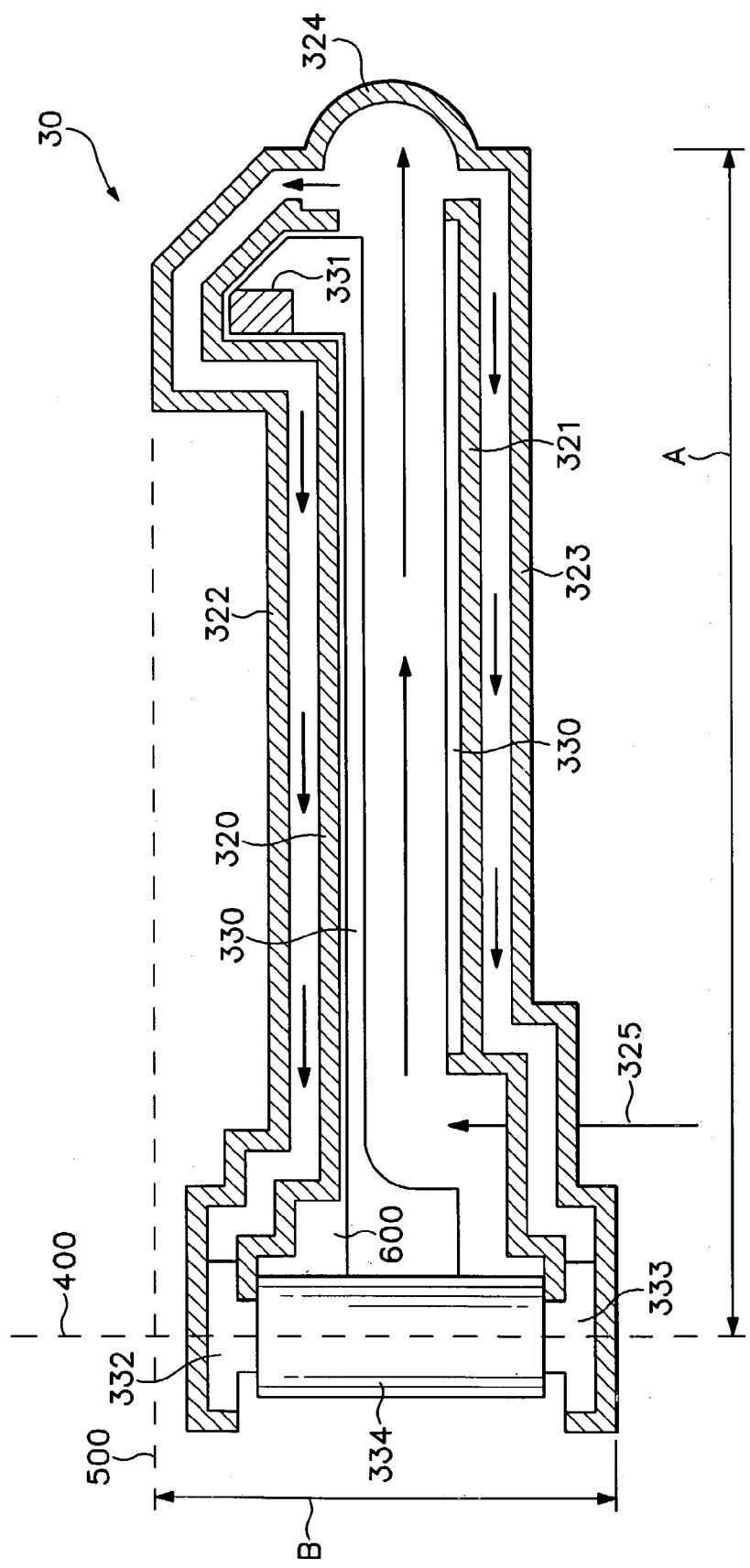
FIG. 6 is a cross-sectional diagram of half of the centrifugal liquid pump of FIG. 3.

FIG. 6 is a cross-sectional diagram of half of the centrifugal liquid pump assembly 30 of FIG. 3, showing the structure of the pump in a plane that intersects the pump at the axis of rotation 400 and the upper and lower HBSLs 322, 323. The sizes of some elements in FIG. 6 have been exaggerated to facilitate understanding of the relationship between elements. Therefore, FIG. 6 should not be taken as an accurate depiction of the proper tolerances and sizes for elements of pump 3. Rather, this drawing will better enable understanding of this and other embodiments of the invention.

The arrows in FIG. 6 illustrate the direction of the liquid coolant flow when the pump assembly 30 is operating. Although the presence of upper and lower HBSLs 322, 323 blocks the entrance of coolant in this plane, the coolant can enter the pump 30 via the inlet 325 at other locations. The impeller 330 is attached to the impeller spindle 334, and the ring magnet 331 is attached to an outer perimeter of the impeller 330, adjacent to the upper pump housing 320. When the pump 30 is operating, the coolant flows radially outward toward the perimeter of the pump where it is forced out of the outlet 324. Small openings at the radial outer ends of the upper HBSL 322 and lower HBSL 323 draw off some of the coolant and redirect it towards the axis 4. Although not shown in FIG. 6, the pressure of the coolant as it flows past the upper bearing 332 and the lower bearing 333 causes the upper bearing 332 and the lower bearing 333 to be suspended away from the sides of the upper pump housing 320 and lower pump housing 321, respectively.

In the embodiment illustrated in FIG. 6, there is a tiny gap 600 between the impeller 330 and the upper pump housing 320. After the coolant passes the upper bearing 332 and the impeller shaft 334, coolant flows through this tiny gap 600. The gap 600 provides a return path so that the coolant can reenter the main coolant flow and also separates the impeller 330 from the upper pump housing 320. The portion of the impeller 330 adjacent to the lower pump housing 321 also has a similar gap (not shown). However, since the coolant routed through the lower HBSL 323 reenters the main flow after it passes the lower bearing 333 and the impeller shaft 334, whatever flow that exists in that gap is present because of the adjacent main flow. The portion of the impeller 330 adjacent to the lower pump housing 321 is structurally attached to the portion of the impeller 330 adjacent to the upper pump housing 320 by the fins (330a of FIG. 5).

With reference to FIGS. 3 and 6, the motor electronics assembly 31 does not extend above the top of the upper HBSL 322. That is, the motor electronics assembly 31 is located below line 500 in FIG. 6. The ring magnet 331 of the impeller assembly 33 is physically located in substantially the same plane as the motor pole cores 311 and the wire windings 312. During operation of the pump 30, the rotating magnetic field generated by the motor electronics assembly 31 applies force to the ring magnet 331 through the plastic pump housing assembly 32, causing the ring magnet 331 along with the attached impeller 330 to rotate.

This application of force to the perimeter of the impeller 330 has several advantages over conventional pumps. For example, torque requirements are lower than in conventional pumps. With reference to FIGS. 3–6, because rotational force is applied at a distance farther away from the impeller shaft 334 (creating a longer lever arm than in conventional pumps), less torque is required to spin the impeller than a conventional pump having the same size impeller.

Another advantage is that because force is not applied to an impeller shaft having magnets attached to the shaft, the length of the impeller shaft 334 can be relatively small. As seen in the embodiment of FIG. 6, a dimension B of pump 30 is much smaller with respect to dimension A. In the particular embodiment of FIG. 6, the pump 30 is designed to fit within a floppy disk drive bay of a computer chassis, which is typically 1.8"×5.9"×8" in size. In one embodiment, the A dimension of FIG. 6 (between axis 400 and the outer perimeter of pump 30) is approximately 2.5" and the B dimension (between the lowermost part of pump 30 and line 500) is approximately 1.25", which leaves sufficient space around pump assembly 30 to allow for the airflow required by other parts of pump, such as the motor electronics assembly 31. Many embodiments of the invention are possible because the dimensions A and B of FIG. 6 are easily scalable depending on the particular pump application required.

Another advantage of the embodiment shown in FIGS. 3–6 is increased bearing life for the upper bearing 332 and the lower bearing 333. As mentioned previously, one factor contributing to this durability is the suspension of the bearings 332, 333 away from the pump housing assembly 32 by coolant forced back toward the axis 400 by the upper and lower HBSLs 322, 323. Another factor is that decreasing the torque requirements also means that the rotational speed of the impeller can be decreased, further contributing to increased bearing life.

Figure 7:
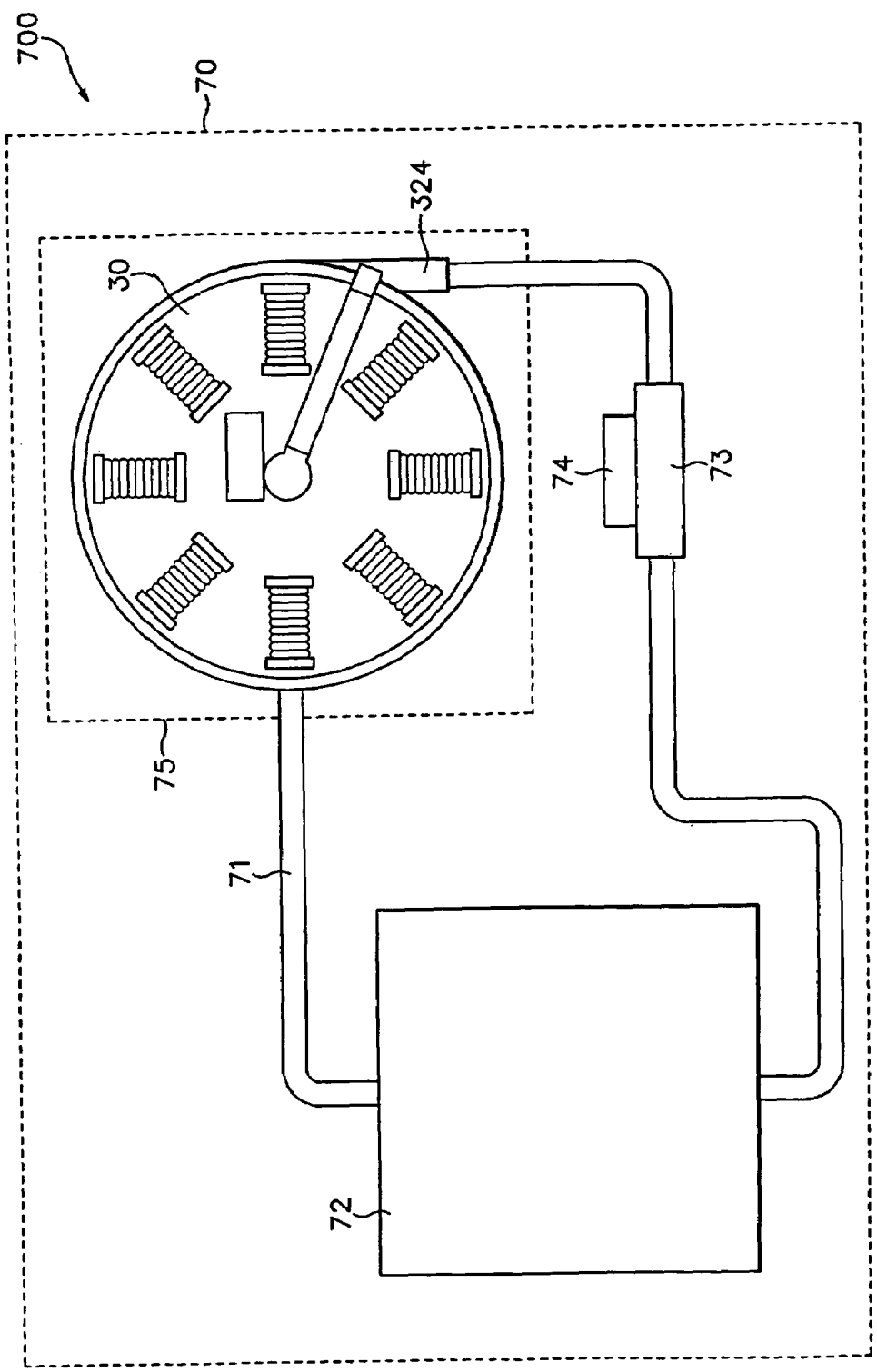
FIG. 7 is a block diagram illustrating an LC system for a desktop computer.

FIG. 7 is a block diagram that conceptually illustrates an LC system 700 for a desktop computer that includes pump 30 described with reference to FIGS. 3–6. A computer chassis 70 contains a pump 30, tubing 71, a heat exchanger 72, a cold plate 73, a CPU 74, and a floppy disk drive bay 75, as well as other components of the computer (not shown). The pump 30 is physically located within the floppy disk drive bay 75. Tubing 71 connects the components of the LC system shown in FIG. 7 and transfers the liquid coolant between the components. The flow direction of the liquid coolant is indicated by the direction of the arrows, which from the perspective of FIG. 7 is clockwise. The operation of the elements in FIG. 7, other than that of pump 30, is well-known in the art and so will only be described at a high level.

When pump 30 is operational, liquid coolant is expelled from the outlet 324 and into the cold plate 73 that is attached to the CPU 74. At the cold plate 73, heat is transferred from the CPU 74 to the liquid coolant circulating in cold plate 73. The heated liquid coolant then enters the heat exchanger 72 located elsewhere inside the computer chassis 70. The liquid coolant flows through the heat exchanger 72, which has a very large surface area because of many fin-like structures (not shown) that define a path for the liquid coolant. The heat exchanger 72 transfers heat from the liquid coolant to the air surrounding it via the fin-like structures. Preferably, the heat exchanger 72 is physically located at a position in the computer chassis 70 that receives a direct flow of air from the standard forced air cooling system present in most desktop computers (not shown). In alternative embodiments, the heat exchanger 72 may itself be an integral part of the computer chassis 70. For example, the heat exchanger 72 may define one side or multiple sides of the computer chassis 70.

The liquid coolant, after being chilled in the heat exchanger 72, flows into pump 3 through the inlet (325 of FIG. 4) at the bottom of pump 3. The liquid coolant circulates in pump 3 as was previously described with reference to FIG. 6.

In operation, and with reference to FIGS. 3–7, the pump 30 accepts cooling fluid at an inlet 325 that has an opening near the center of the impeller 330. Rotating the impeller 330 of the pump 30 causes blades of the impeller to force the cooling fluid out toward edges of the impeller, where the cooling fluid is then at a higher pressure than at the inlet 325. An outlet 324 for the pump 30 is an opening in the housing near the high pressure portion of the impeller 330. Thus, when the impeller 330 rotates, cooling fluid is forced by the impeller fins from the inlet 325 to the edge of the impeller, and then out of the outlet 324. A typical cooling loop circulates the fluid through a coldplate 73 attached to a warmer component (oftentimes a microprocessor, such as CPU 74 in FIG. 7) to cool the component. Next the cooling fluid is cooled back down in a heat exchanger 72, before it is forced back into the inlet 325. In this way, cooling fluid is constantly circulating in the cooling loop to reduce the temperature of the component.

The particular liquid used as the coolant in the pump 30 described with respect to FIGS. 3–7 may be chosen from any number of liquids. The liquid coolant most commonly used is a water-based coolant having an additive such as anti-freeze. The exact choice of liquid coolant will depend on the materials used to make the pump and other components of the LC system, operating environment, etc. In preferred embodiments, non-corrosive, non-toxic liquid coolants are used, such as pure water.

Other system concerns related to LC system 700 include the effect of the motor electronics on other computer circuits that lie in close proximity to pump assembly 30. However, this concern is minimal since the motor electronics assembly (31 of FIG. 4) is similar in form and type to the spindle motors that are already used for floppy disk drives.

The invention may be embodied in other specific forms without departing from its spirit or essential characteristics. The described embodiment is to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

I claim:

1. A liquid cooling apparatus comprising:
a centrifugal pump assembly including an impeller connected to an impeller shaft, the impeller shaft configured to rotate with the impeller, a diameter of the impeller greater than a length of the impeller shaft in a direction perpendicular to the diameter of the impeller; and
a spindle motor.

2. The apparatus of claim 1, the centrifugal pump assembly further comprising a pump housing.

3. The apparatus of claim 2, the pump housing enclosing the impeller, the impeller including a ring magnet that is affixed to a perimeter edge of the impeller.

4. The apparatus of claim 3, further comprising a first and a second bearing slidably mounted to the housing, the impeller coupled to the first and second bearings.

5. The apparatus of claim 4, wherein the first and second bearings are floating bearings.

6. The apparatus of claim 5, wherein the housing includes a coolant channel structured to redirect pressurized coolant towards the first bearing.

7. The apparatus of claim 6 wherein the impeller comprises impeller fins mounted on the impeller shaft, and wherein a first end of the coolant channel terminates at a first end of the impeller shaft.

8. The apparatus of claim 7 wherein a second end of the coolant channel terminates at an outlet of the pump assembly.

9. The apparatus of claim 7, further comprising a second coolant channel structured to redirect pressurized coolant towards the second bearing.

10. The apparatus of claim 9, wherein an end of the second coolant channel terminates at a second end of the impeller shaft.

11. A liquid-cooled computer system, comprising:
a centrifugal pump assembly,
a spindle motor;
a heat exchanger;
a cold plate coupled to a heat generating unit; and
liquid coolant.

12. The computer system of claim 11 wherein the centrifugal pump assembly comprises an impeller having a ring magnet affixed to a perimeter edge of the impeller.

13. The computer system of claim 11 wherein the centrifugal pump assembly comprises one or more floating bearings.

14. The computer system of claim 11 wherein the heat generating unit is a microprocessor.

15. The computer system of claim 11, further comprising a chassis having a plurality of hardware mounting bays, and wherein the centrifugal pump assembly is mounted in one of the hardware bays.

16. The computer system of claim 15 wherein the centrifugal pump assembly is mounted within a disk drive bay of the computer chassis.

17. The computer system of claim 16 wherein the disk drive bay has dimensions that measure less than 1.8 inches by 5.9 inches by 8.0 inches.

18. The computer system of claim 11, the heat generating unit comprising a component of the computer system.

19. A liquid cooling apparatus comprising:
a centrifugal pump assembly having a pump housing that encloses an impeller having a ring magnet affixed to a perimeter edge of the impeller; and
a spindle motor.

20. The apparatus of claim 19, further comprising a first and a second bearing slidably mounted to the housing, the impeller coupled to the first and second bearings.

21. The apparatus of claim 20, the first and second bearings comprising floating bearings.

22. The apparatus of claim 21, the housing including a coolant channel structured to redirect pressurized coolant towards the first bearing.

23. The apparatus of claim 22, the impeller comprising impeller fins mounted on an impeller shaft, a first end of the coolant channel terminating at a first end of the impeller shaft.

24. The apparatus of claim 23, a second end of the coolant channel terminating at an outlet of the pump assembly.

25. The apparatus of claim 23, further comprising a second coolant channel structured to redirect pressurized coolant towards the second bearing.

26. The apparatus of claim 25, an end of the second coolant channel terminating at a second end of the impeller shaft.

27. A liquid cooling system comprising:
a centrifugal pump assembly including an impeller having a ring magnet affixed to a perimeter edge of the impeller;
a spindle motor;
a heat exchanger;
a cold plate; and
liquid coolant.

28. The apparatus of claim 27, further comprising a first and a second bearing slidably mounted to a pump housing, wherein the impeller is coupled to the first and second bearings.

29. The apparatus of claim 27, the housing including a coolant channel structured to redirect pressurized coolant towards the first bearing.

30. The apparatus of claim 29, the impeller including an impeller shaft, an end of the coolant channel terminating at a first end of the impeller shaft.

31. The apparatus of claim 29, further comprising a second coolant channel structured to redirect pressurized coolant towards the second bearing.

32. A method for cooling a heat-producing unit, the method comprising:
driving a centrifugal pump assembly with a spindle motor to create a high pressure area of cooling liquid in the pump assembly;
routing the cooling liquid to the heat-producing unit, and afterwards running the cooling liquid through a heat exchanger; and routing the cooling liquid from the heat-producing unit back to the centrifugal pump assembly.

33. The method of claim 32, wherein driving a centrifugal pump assembly further comprises redirecting a flow of liquid coolant from the high pressure area to cause bearings within the centrifugal pump to float.

34. The method of claim 32, wherein driving a centrifugal pump assembly comprises applying a magnetic field to a perimeter edge of an impeller housed in the centrifugal pump assembly.

* * * * *